United States Patent [19]

Ewart-Paine

[11] Patent Number: 5,407,504
[45] Date of Patent: Apr. 18, 1995

[54] METHOD FOR JOINING CERAMIC TO CERAMIC OR TO CARBON

[75] Inventor: Lynn M. Ewart-Paine, Barrington, R.I.

[73] Assignee: The United States of America as represented by the Secretary of the Army, Washington, D.C.

[21] Appl. No.: 154,323

[22] Filed: Nov. 18, 1993

[51] Int. Cl.$^6$ .............................................. C04B 37/00
[52] U.S. Cl. .................................. 156/89; 156/306.6; 428/224
[58] Field of Search ................ 156/89, 306.6; 428/224

[56] References Cited

U.S. PATENT DOCUMENTS

| | | | |
|---|---|---|---|
| 4,252,588 | 2/1981 | Kratsch et al. | 156/89 |
| 4,293,439 | 10/1981 | Corbett et al. | 501/20 |
| 4,487,644 | 12/1984 | Gupta et al. | 156/89 |
| 4,514,240 | 4/1985 | Herand | 156/89 |
| 4,692,418 | 9/1987 | Boecker et al. | 501/88 |
| 4,762,269 | 8/1988 | Gyavmati et al. | 228/194 |
| 4,772,346 | 9/1988 | Anderson et al. | 156/89 |
| 4,808,659 | 2/1989 | Nishihawa et al. | 524/701 |
| 4,832,771 | 5/1989 | Hamamoto et al. | 156/89 |
| 4,857,395 | 8/1989 | Benton et al. | 428/698 |
| 4,862,763 | 9/1989 | Stone, III et al. | 156/173 |
| 5,013,609 | 5/1991 | Niebylski | 428/688 |
| 5,067,999 | 11/1991 | Streckeut et al. | 156/89 |
| 5,089,071 | 2/1992 | Tominaga et al. | 156/89 |
| 5,139,594 | 8/1992 | Rabin | 156/89 |
| 5,173,367 | 12/1992 | Liimatta et al. | 428/608 |
| 5,211,999 | 5/1993 | Okada | 428/698 |
| 5,217,770 | 6/1993 | Morris, Jr. et al. | 428/300 |
| 5,229,481 | 7/1993 | Tilley | 528/10 |
| 5,244,720 | 9/1993 | Leung et al. | 428/266 |
| 5,308,421 | 5/1994 | Gonozy et al. | 156/89 |

FOREIGN PATENT DOCUMENTS

| | | |
|---|---|---|
| 63-12378 | 5/1988 | Japan . |
| 63-12379 | 5/1988 | Japan . |
| 0255653 | 3/1990 | Japan . |

Primary Examiner—W. Gary Jones
Assistant Examiner—Mark De Simone
Attorney, Agent, or Firm—Freda L. Krosnick; Muzio B. Roberto

[57] ABSTRACT

A method for joining sections of densified ceramics, and ceramics to carbon comprising the steps of: placing a preceramic polymer between bodies of the materials to be joined, applying mechanical force thereto, and heating to a temperature sufficient to convert the preceramic polymer to constituents of the materials to be joined thus bonding the materials, and cooling to room temperature.

9 Claims, No Drawings

METHOD FOR JOINING CERAMIC TO CERAMIC OR TO CARBON

RIGHTS OF THE GOVERNMENT

The invention described herein may be manufactured, used and licensed by or for the Government for Governmental purposes without payment to me of any royalties thereon.

BACKGROUND OF THE INVENTION

1. Field of Invention

The invention relates to a method of joining densified bodies of a ceramic to a ceramic or to carbon using a polymer which converts on pyrolysis to the constituents of the materials being joined. The bonding is carried out at lower temperatures than prior art joining techniques.

2. Description of Prior Art

Bates et al, U.S. Pat. No. 4,921,554 discloses a joining method for alpha-silicon carbide which is practiced when the bodies to be joined are green bodies.

Gupta, U.S. Pat. No. 4,487,644 discloses the joining of silicon carbide when the silicon carbide is silicon rich (at least 8% excess silicon). The joining is accomplished at temperatures between 1,500° C. and 1,800° C.

Coes, U.S. Pat. No. 4,070,197 discloses a joining method which uses a slip containing alpha-silicon carbide of a composition which matches the two alpha-silicon carbide pieces to be joined.

Haley, U.S. Pat. No. 4,419,161 discloses a joining method which can be used on either green bodies or fully dense pieces of alpha-silicon carbide. The pieces are joined with a metal boride such as molybdenum boride.

P/N 2,015,910 (Great Britain) discloses the use of molybdenum disilicide and a binder mixed together as a powder to form alpha-silicon carbide. Joining is achieved at temperatures above 2030° C.

SUMMARY OF INVENTION

Subject invention relates to a method for joining sections of densified ceramics, such as silicon carbide to silicon carbide, and densified ceramics to carbonaceous materials, such as silicon carbide to graphite, by pyrolysis of a preceramic polymer, such as polycarbosilane, positioned between the sections. The polycarbosilane is converted to a ceramic material with some free carbon at temperatures as low as 1000° C. and forms an interlayer joining the sections.

The present method has several advantages over the utilization of means such as an adhesive, glue or metal interlayer to join densified bodies. It reduces the mismatch of properties, such as the elastic modulus. Further, the change in the coefficient of thermal expansion across the joint surface is greatly reduced thus decreasing the residual stresses at the joined surfaces. In addition, the corrosion and oxidation resistance of adhesives, glues, and metals is usually inferior to that of ceramic materials.

Furthermore, the process also joins silicon carbide with a ceramic interlayer at temperatures relatively low compared to other silicon carbide joining methods. In addition, joining is achieved without the need to match the crystallography, the exact chemical composition or the microstructure of the ceramic interlayer to the materials being joined.

It is an object of the present invention to provide and disclose a method for joining sections of similar or dissimilar bodies using a polymer which on pyrolysis forms an interlayer containing the constituents of the bodies thus bonding the sections.

It is a further object of the invention to provide and disclose a method for joining sections of ceramics using a polymer which on pyrolysis forms an interlayer containing the constituents of the ceramics thus bonding the ceramic sections.

It is a further object of the invention to provide and disclose a method for joining sections of silicon carbide and graphite using a polymer which on pyrolysis forms an interlayer containing silicon carbide and carbon thus bonding bond the materials.

Other objects and a fuller understanding of the invention may be ascertained from the following description and claims.

DESCRIPTION OF PREFERRED EMBODIMENT

The present invention applies to dense alpha-silicon carbide. It is preferable that the density of the sections be as close to theoretical density as possible. The presence of large porosity at a surface to be joined can create unbonded regions in the joint. This is especially true if the porosity has a depth into the surface of approximately 10 microns or more.

The surfaces to be joined on the silicon carbide sections are polished to a mirror-like finish. This step is omitted in regard to carbon in the bonding of silicon carbide to graphite, (Example 4). Polishing is best accomplished be grinding and polishing with a diamond paste down to a final finish of 6 microns or smaller.

After polishing, the surfaces are degreased, and the surface oxide is removed. Any conventional solvent may be used for degreasing. Removal of the surface oxide is accomplished by placing the silicon carbide pieces to be joined into a hydrofluoric acid solution until the surfaces to be joined become hydrophobic, indicating the absence of a surface oxide. Any surface contaminants or oxide which are not removed will greatly interfere with the ability of the ceramic conversion product to join the surfaces and will compromise the mechanical integrity of the joint.

Polycarbosilane is placed on top of one of the surfaces to be joined. To do this a razor may be used to scrap the surface of the polycarbosilane piece so that a fine polymer powder falls from the polycarbosilane piece and coats one of the surfaces to be joined with a thin layer of polymer powder.

To calculate the quantity of polycarbosilane applied to the surface, a starting joint thickness is assumed. The surface area to be joined is multiplied by the starting joint thickness. This gives a starting joint volume. The starting joint volume is multiplied by the theoretical density of the main conversion product, silicon carbide, to yield a mass. The mass is adjusted for the weight loss of the polycarbosilane during pyrolysis and conversion to the ceramic product. The adjustment for weight loss is accomplished by dividing the mass be the subtraction (1—the weight loss during pyrolysis and conversion). It is important to note that the completed joint thickness after the joining process is significantly less than the assumed starting joint thickness due to the application of pressure during pyrolysis.

The other polished silicon carbide surface to be joined is placed on top of the surface which is coated with the polycarbosilane powder. The silicon carbide/- polycarbosilane/silicon carbide assembly is mechanically loaded so that the applied force acts perpendicular to the joint during the entire pyrolysis and conversion process. This inhibits sliding of the two surfaces parallel to the joint, reduces joint thickness and increases the mechanical strength of the joint. The mechanically loaded silicon carbide/polycarbosilane/silicon carbide assembly is then heated in an inert environment until the polycarbosilane is converted into a ceramic interlayer.

EXAMPLE 1

Two pieces of silicon carbide measuring 18.1 mm × 18.1 mm × 25.5 mm were cut from larger pieces of Carborundum's Hexalloy alpha-silicon carbide. The two pieces were to be joined at the 18.1 mm × 18.1 mm surfaces. One of the 18.1 mm × 18.1 mm surfaces on each piece was fine ground and then polished with 6 micron diamond paste. Each piece was immersed in a beaker of acetone and placed in an ultrasonic cleaner for 10 minutes to degrease the surfaces to be joined. The surfaces were then immersed in a solution of 10% hydrofluoric acid and rinsed to remove the surface oxide.

The polycarbosilane used to from the interlayer between the silicon carbide surfaces is manufactured in Japan by Nippon Carbon Company, Ltd. and is distributed in the United States by Dow Corning Corporation. A fine polycarbosilane powder was scraped on to the polished surface of one of the silicon carbide pieces. The polished surface of the polycarbosilane-free silicon carbide piece was placed face down on top of the polycarbosilane powder. The applied polycarbosilane powder mass was calculated from the formula given above, and the calculation is as follows:

(1.81 cm × 1.81 cm × 0.004 cm × 3.2 gm/cm)/0.7 = 0.0599 grams where the surface area to be joined is 1.81 cm × 1.81 cm, the starting joint thickness is 0.004 cm, the theoretical density of silicon carbide is 3.2 grams/cm and the weight loss during conversion is taken to be approximately 30% so that 1-weight loss during conversion is 0.7. It is important to note that due to the application of a mechanical load during pyrolysis, the completed joint thickness after the joining process was less than 1 micron.

A small graphite tube with an inner diameter of 25.5 mm and a height of 30 mm was placed around the silicon carbide/polycarbosilane/silicon carbide assembly to restrain any movements parallel to the joint.

Two silicon carbide tiles were placed on top of the assembly to apply a mechanical load. The total pressure was 20 psi. The mechanically loaded silicon carbide/polycarbosilane/silicon carbide assembly was heated in a nitrogen atmosphere under the following conditions:
a) heat up to 300° C. at a rate of 600° C. per hour,
b) hold at 300° C. for 15 minutes,
c) heat up to 1200° C. at a rate of 100° C. per hour,
d) hold at 1200° C. for 3 hours, and
e) cool to room temperature at a rate of approximately 600° C. per hour.

The joined pieces of silicon carbide were machined into bend bars with the joint interface oriented perpendicular to the longitudinal axis. The bars were machined according to MIL-STD 1942A for B-sized bend bars with the exception that only the tensile surface edges were chamfered. Six of the bend bars were tested in a 4 point bend fixture and had an average flexural strength of 13,500 psi.

EXAMPLE 2

The joining steps of Example 1 were repeated with the exception of a variance in the heating schedule. The mechanically loaded silicon carbide/polycarbosilane/silicon carbide assembly was heated in a nitrogen atmosphere under the following conditions:
a) heat to 300° C. at a rate of 600° C. per hour,
b) hold at 300° C. for 15 minutes,
c) heat to 1200° C. at a rate of 100° C. per hour,
d) hold at 1200° C. for 15 minutes,
e) heat to 1500° C. at a rate of 600° C. per hour,
f) hold at 1500° C. for 2 hour, and
g) cool to room temperature at a rate of approximately 600° C. per hour.

Ten of the bend bars were tested in a 4 point bend fixture. The average flexural strength obtained was 15,100 psi.

EXAMPLE 3

The steps of Example 1 were repeated with the exception of a variance in the heating schedule. The mechanically loaded silicon carbide/polycarbosilane/silicon carbide assembly was heated in a nitrogen atmosphere under the following conditions:
a) heat to 300° C. at a rate of 600° C. per hour,
b) hold at 300° C. for 15 minutes,
c) heat to 1200° C. at a rate of 100° C. per hour, and
d) cool to room temperature at a rate of approximately 600° C. per hour.

In this heating schedule, there was no hold at 1200° C. Under these conditions, the joined silicon carbide pieces broke apart at the joint while they were being mounted for examination of the joint. As shown by comparison to Example 1, a 3 hour hold at 1200° C. can increase the strength of the joints from approximately 0 psi to approximately 13,500 psi.

EXAMPLE 4

The steps of Example 3 above were repeated with the exception that:
a) one piece of silicon carbide measuring 17 mm × 15 mm × 2.5 mm was used,
b) the quantity of polycarbosilane applied to the joint was calculated using a starting joint thickness of 5 microns instead of 40 microns and,
c) an assembly consisting of silicon carbide/polycarbosilane/graphite was used instead of silicon carbide/polycarbosilane/silicon carbide.

The graphite used was GRAFOIL which is the trade name for graphite in foil form produced by Union Carbide Corporation. An attempt was made to separate the graphite from the silicon carbide after the joining. Separation occurred in the graphite and not at the joint with the silicon carbide. This indicated that the joining was successful.

Other preceramic polymers exist which convert to ceramic products on the pyrolysis thereof. These polymers would have utility in joining bulk ceramics having compositions similar to the conversion product of the preceramic polymer. For example, polysilanes convert on pyrolysis primarily to silicon carbide. Thus, bodies of silicon carbide would be joinable by in situ conversion of a polysilane using the techniques of the present invention. Other polymers of interest are polysilazanes and organometallic aluminum polymers. Polysilazanes convert to silicon nitride and they would have utility joining bodies of silicon nitride. Organometallic aluminum polymers which convert to aluminum nitride would have utility joining bodies of aluminum nitride. Organometallic aluminum polymers which convert to aluminum oxide would have utility joining bodies of aluminum oxide.

Although I have described my invention with a certain degree of particularity, it is understood that other ceramics and carbonaceous materials may be joined by selecting reactants whose conversion product has a similar composition to the materials to be joined.

Having described my invention, I claim:

1. A method for joining sections of a densified ceramic wherein the mechanical strength of the joint obtained is substantially equivalent to that of the ceramic materials joined, comprising the steps of:
   selecting two sections of a ceramic to be joined,
   subjecting the two surfaces to be joined to a cleansing process,
   positioning a thin layer of a preceramic polymer between the surfaces to be joined which converts on pyrolysis to an interlayer containing the constituents of the ceramics to be joined,
   subjecting the ceramic/preceramic polymer/ceramic assembly to a mechanical load so that the applied load acts perpendicular to the joint,
   heating the loaded assembly in an inert environment to a temperature sufficient to cause conversion of the preceramic polymer to a ceramic, and joining the ceramic materials, and
   cooling to room temperature.

2. A method in accordance with claim 1, wherein the ceramic to be joined is silicon carbide.

3. A method in accordance with claim 2, wherein the preceramic polymer is polycarbosilane.

4. A method in accordance with claim 3, wherein the assembly is held at a temperature of about 1200° C. for a period of about 3 hours, and cooled to room temperature at the rate of about 600° C. per hour.

5. A method in accordance with claim 3, wherein the assembly is held at a temperature of about 1500° C. for a period of about 2 hours, and cooled to room temperature at the rate of about 600° C. per hour.

6. A method for joining sections of a densified ceramic and carbon comprising the steps of:
   selecting a section of a densified ceramic and carbon to be joined,
   subjecting the ceramic surface to be joined to a cleansing process
   positioning a thin layer of a preceramic polymer between the surfaces to be joined which converts on pyrolysis to an interlayer containing constituents of the materials to be joined,
   subjecting the ceramic/preceramic polymer/carbon assembly to a mechanical load so that the applied load acts perpendicular to the joint,
   heating the loaded assembly in an inert environment to a temperature sufficient to cause conversion of the preceramic polymer to an interlayer containing constituents of both materials to be joined, and joining the materials, and
   cooling to room temperature.

7. A method in accordance with claim 6, wherein the materials to be joined are silicon carbide and graphite.

8. A method in accordance with claim 7 wherein the preceramic polymer is polycarbosilane.

9. A method in accordance with claim 8 wherein the assembly is heated to a temperature of about 1200° C., and cooled to room temperature at a rate of about 600° C. per hour.

* * * * *